United States Patent [19]

Zedler et al.

[11] Patent Number: 4,661,223

[45] Date of Patent: Apr. 28, 1987

[54] PROCESS FOR COATING AN ELECTRICALLY CONDUCTIVE SUBSTRATE AND AN AQUEOUS COMPOSITION CONTAINING A CATIONIC BINDER

[75] Inventors: Angelika A. Zedler, Stuttgart, Fed. Rep. of Germany; Jean J. Trescol, Nogent, France

[73] Assignee: Akzo nv, Arnhem, Netherlands

[21] Appl. No.: 804,324

[22] Filed: Dec. 5, 1985

Related U.S. Application Data

[63] Continuation of Ser. No. 528,974, Sep. 2, 1983, abandoned.

[30] Foreign Application Priority Data

Sep. 9, 1982 [NL] Netherlands ................... 8203507

[51] Int. Cl.[4] ............... C25D 13/06; B05D 3/02; C08L 67/02
[52] U.S. Cl. ............... 204/181.7; 427/388.2; 524/513
[58] Field of Search ........ 204/181.7; 524/513; 427/385.5, 388.2, 388.4, 422, 435, 429, 430.1

[56] References Cited

U.S. PATENT DOCUMENTS

| | | | |
|---|---|---|---|
| 3,882,188 | 5/1975 | Behmel | 525/443 |
| 3,954,588 | 5/1976 | Hazan et al. | 204/181.1 |
| 4,020,216 | 4/1977 | Miller | 524/513 |
| 4,195,147 | 3/1980 | Sekmakas et al. | 524/761 |
| 4,211,691 | 7/1980 | Fitzgerald et al. | 524/513 |
| 4,293,475 | 10/1981 | Sidi | 524/513 |
| 4,337,187 | 6/1982 | Hazan | 524/504 |
| 4,339,365 | 7/1982 | Becher et al. | 524/513 |
| 4,414,357 | 11/1983 | Wright et al. | 524/513 |

*Primary Examiner*—Donald R. Valentine
*Attorney, Agent, or Firm*—Stevens, Davis, Miller & Mosher

[57] ABSTRACT

A process is provided for coating an electrically conductive substrate with an aqueous coating composition containing a cationic binder wherein the binder is obtained by polymerization of 100 parts by weight of a specified monomer mixture in the presence of a specified ethylenically unsaturated polyester resin, the degree of unsaturation being between 0.1–5.0 equivalents per 1000 molecular weight units and the maximum degree being dependent on the molecular weight and the weight proportion of the polyester. The invention also pertains to the aqueous coating composition as such.

38 Claims, No Drawings

PROCESS FOR COATING AN ELECTRICALLY CONDUCTIVE SUBSTRATE AND AN AQUEOUS COMPOSITION CONTAINING A CATIONIC BINDER

This application is a continuation of application Ser. No. 528,974, filed 9/2/83, now abandoned.

The invention relates to a process of coating an electrically conductive substrate with an aqueous coating composition. A process of the type indicated above is known from Japanese Patent Application No. 80/21404 (filed on July 31, 1978 under No. 78/92538), in which a composition based on a reaction product of an ethylenically unsaturated compound containing a basic nitrogen atom and an adduct of an epoxy resin and an ethylenically unsaturated carboxylic acid is cataphoretically applied to a conductive substrate. To the use of an epoxy resin there is the disadvantage that it has a detrimental effect on the quality of the cured coating, for instance as far as its colour is concerned. Moreover, applicant has found that the sharp edges of a substrate coated with the known composition are not satisfactorily covered. The invention has for its object to provide a coating composition which does not display said drawbacks and after being cured gives a durable coating having very good mechanical and anti-corrosive properties.

The process according to the invention is characterized in that the cationic binder is obtained by polymerization of 100 parts by weight of a monomer mixture consisting of 1-30% by weight of a hydroxy (cyclo)alkyl (meth)acrylate of which the (cyclo)alkyl group has 2-8 carbon atoms; 4-45% by weight of an amino (meth)acrylate of the formula:

$$(R_1)_2NR_2OOC-\underset{R_3}{C}=CH_2$$

wherein $R_1$ is an alkyl group having 1-12 carbon atoms or a cycloalkyl group having 5-8 carbon atoms, or groups $R_1$ together form an alkylene group having 4-7 carbon atoms which together with the nitrogen atom forms a heterocyclic ring system, and wherein one the groups $R_1$ may be a hydrogen atom, $R_2$ is a hydrocarbon group having 2-12 carbon atoms and $R_3$ is a hydrogen atom or a methyl group, and 40-80% by weight of a monovinyl aromatic hydrocarbon having 8-14 carbon atoms and 0-35% by weight of a different monoethylenically unsaturated monomer having 2-20 carbon atoms, in the presence of A=1-60 parts by weight of a polyester resin having a hydroxyl number in the range of 15 to 150, a calculated number average molecular weight Mn of 800-10,000, and U=0.01-5.0 equivalents of ethylenically unsaturated double bonds per 1000 molecular weight units, provided that the maximum value $U_{max}$ of U equals

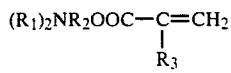

the amino groups contained in the binder being at least partly neutralized with the aid of an acid before, during or after polymerization.

Examples of suitable hydroxy (meth)acrylates suitable for use in the monomer mixture include hydroxy ethyl acrylate, hydroxy ethyl methacrylate, hydroxy propyl acrylate, hydroxy propyl methacrylate, hydroxymethyl acrylate, hydroxy hexyl acrylate, hydroxy octyl acrylate and hydroxy cyclohexyl acrylate. It is preferred that use should be made of hydroxy alkyl acrylates, more particularly hydroxy ethyl acrylate and/or hydroxy propyl acrylate. It is preferred that the monomer mixture should contain 5-24% by weight of hydroxy (cyclo)alkyl (meth)acrylate.

Examples of amino (meth)acrylates suitable for use in the monomer mixture include methylamino ethyl (meth)acrylate, dimethylamino ethyl (meth)acrylate, diethylamino ethyl (meth)acrylate, propylamino ethyl (meth)acrylate, tert. butylamino ethyl (meth)acrylate, hexylamino butyl (meth)acrylate, cyclohexylamino ethyl (meth)acrylate, dimethyl cyclohexylamino ethyl (meth)acrylate, octylamino ethyl (meth)acrylate, dodecylamino ethyl (meth)acrylate, pyridyl ethyl (meth)acrylate, and the chloride or sulphate of trimethyl ammonium ethyl (meth)acrylate. It is preferred that use should be made of a (di)alkylamino (meth)acrylate of which the alkyl group(s) has (have) 1-4 carbon atoms. More particularly, use is made of a β-(di)alkylamino ethyl (meth)acrylate of which the alkyl group(s) has (have) 1-4 carbon atoms, for example: β-dimethylamino ethyl (meth)acrylate and β-diethylamino ethyl (meth)acrylate. It is preferred that the monomer mixture should contain 7-40% by weight, more particularly 10-28% by weight of amino (meth)acrylate.

The monomer mixture contains as third component a monovinyl aromatic hydrocarbon having 8-14, preferably 8-10 carbon atoms. Representative examples include styrene, α-methyl styrene, vinyl toluene and vinyl naphthalene. It is preferred that use should be made of styrene and/or vinyl toluene. It is preferred that the monomer mixture should contain 40-65% by weight of the monovinyl aromatic hydrocarbon.

Finally, the monomer mixture also contains 0-35, preferably 0-15% by weight of some other monoethylenically unsaturated monomer having 2-20 carbon atoms, such as acrylic or methacrylic ester, for example: methyl methacrylate, ethyl acrylate, butyl acrylate, 2-ethylhexyl acrylate, dodecyl acrylate and hexadecyl acrylate; nitriles, for example: acrylonitrile and methacrylonitrile; and compounds such as vinyl chloride, vinyl acetate, vinyl propionate, acrylic acid, methacrylic acid, crotonic acid, itaconic acid and maleic acid.

The ethylenically unsaturated polyester resins to be used according to the invention are prepared by polycondensation of generally one or more aliphatic and/or cycloaliphatic mono-, di- and/or polyvalent alcohols preferably having 2-24 carbon atoms, more particularly 2-9 carbon atoms, and one or more aliphatic, cycloaliphatic and/or aromatic mono-, di- and/or polyvalent carboxylic acids preferably having 2-36 carbon atoms, more particularly 2-12 carbon atoms and/or the anhydrides or acid halides thereof or the esters of such acids and alcohols having 1-6 carbon atoms. Examples of suitable alcohols include, lauryl alcohol, benzyl alcohol, cyclohexanol, ethylene glycol, propylene glycol, neopentyl glycol, 1,6-hexanediol, 2,2-bis(4-hydroxy cyclohexyl)-propane, 2,2-bis(p-phenylene oxyethanol)-propane, 2,2-bis-(p-phenylene oxypropanol-2)- propane, diethylene glycol, glycerol, trimethylol ethane, trimethylol propane, pentaerythritol and/or dipentaerythritol. Preferred are neopentyl glycol, trimethylol propane and pentaerythritol.

Examples of suitable di- or polyvalent carboxylic acids include maleic acid, fumaric acid, itaconic acid, citraconic acid. oxalic acid, malonic acid, succinic acid, glutaric acid, adipic acid, azelaic acid, sebacic acid, tetrahydrophthalic acid, hexahydrophthalic acid, endomethylene tetrahydrophthalic acid, o-phthalic acid, dichlorophthalic acid, hexachloroendomethylene tetrahydrophthalic acid, isophthalic acid, terephthalic acid, trimellitic acid and/or pyromellitic acid. Optionally, the carboxylic acid may be used in the form of an acid halide such as an acid chloride, or an anhydride, for instance: maleic anhydride or phthalic anhydride, or as ester, for instance: dimethyl itaconate and dimethyl terephthalate or dehydrated castor oil. A preferred dicarboxylic acid is phthalic anhydride, optionally mixed with hexahydrophthalic acid, itaconic acid and/or maleic anhydride. It is preferred that use should be made of a cycloaliphatic or aromatic dicarboxylic acid having 8-10 carbon atoms or a derivative thereof; more particularly a tetrahydrobenzene dicarboxylic acid, a hexahydrobenzene dicarboxylic acid and/or a benzene dicarboxylic or an anhydride thereof.

Examples of suitable monovalent carboxylic acids include benzoic acid and fatty acids having 5-18 and preferably 7-18 carbon atoms, such as valeric acid, heptanoic acid, 2-ethylcaproic acid, pelargonic acid, isononanoic acid, lauric acid, coconut oil fatty acid, tall oil fatty acid, linoleic acid, linolenic acid, dehydrated caster oil fatty acid, stearic acid and branched fatty acids having 18 carbon atoms. Optionally, the fatty acid may be used in dimerized form. If the desired ethylenic double bonds in the polyester resin are exclusively obtained from an ethylenically unsaturated fatty acid, then the polyester should contain 3-70% by weight of that fatty acid, preferably 5-55% by weight. Examples of suitable fatty acids which may be polyunsaturated or not having double bonds which may or may not be conjugated include linseed oil fatty acid, sunflower oil fatty acid, tall oil fatty acid and/or ricinene oil fatty acid.

It is preferred that the binder should be obtained by polymerization of 100 parts by weight of the monomer mixture per 5-50 parts by weight, more particularly 5-40 parts by weight of the polyester resin. It is also preferred that use should be made of hydroxy (cyclo)alkyl (meth)acrylate, monovinyl aromatic hydrocarbon and the optionally present, other ethylenically unsaturated monomer [other than the amino (meth)acrylate] in amounts such that the binder contains more than 70% by weight, more particularly 70.1-92% by weight, thereof.

According to the invention the polyester resin preferably has a hydroxyl number of 30-70, a calculated number average molecular weight of 1500-8000 and an unsaturation of 0.3-3.5 equivalents of ethylenically unsaturated double bonds per 1000 molecular weight units. The acid number of the polyester resin is generally 2-80, preferably 8-20.

The polycondensation reaction for the preparation of the polyester resin is generally carried out at a temperature in the range of 140° to 300° C., preferably 180° to 240° C., and in an inert atmosphere of, for instance, nitrogen and/or carbon dioxide. The water evolved during polycondensation may be removed in the usual manner, for instance by distillation under reduced pressure or by azeotropic distillation using an organic solvent, for instance toluene or xylene. After termination of the polycondensation reaction, these solvents may, if desired, be removed from the polyester resin by distillation. As esterification catalyst there may be used any conventional compound, such as sulphuric acid, p-toluene sulphonic acid, benzene sulphonic acid, naphthalene sulphonic acid and metal compounds, such as dibutyltin oxide and dibutyltin dilaurate, but the presence of a catalyst is optional.

Polymerization of the monomer mixture in the presence of the polyester resin may be carried out by methods known in themselves, use being made of a free radical initiator in an organic solvent at a temperature generally in the range of 10° to 130° C., the reaction mixture being exposed to ultraviolet radiation, if desired. For instance, polymerization may take place with continuous addition of a mixture of the monomers and initiator to a solution of the polyester resin; and the monomer composition that is chosen may be constant or variable.

Examples of suitable solvents include polar solvents such as ketones, for instance: methylethyl ketone; alcohols, for instance: the ethyl ether or the butyl ether of ethylene glycol; and the ethyl ether of the ethylene glycol acetate. Generally, use is made of initiators which have such a half-life period at the chosen polymerization temperature that throughout the polymerization reaction a certain amount of initiator is present. Preferably, the polymerization is continued up to a conversion of the monomer mixture of at least 95%, more particularly 98-100%.

Examples of suitable radical initiators include 2,2'-azobisisobutyronitrile, benzoyl peroxide, tert. butyl peroctoate and methylethyl ketone peroxide. The initiator is usually employed in an amount of 0.2-8, preferably 1-7% by weight, based on the weight of the monomer mixture. Optionally, the initiator may be added to the polymerization mixture batchwise.

For the resulting polymerization product to be made cationic and water-soluble the amino groups present should at least be partly neutralized. This is generally done in a known manner and with the aid of an (in)organic acid. Examples of suitable acids include boric acid, phosphoric acid, sulphuric acid, sulphurous acid, hydrochloric acid, formic acid, acetic acid, propionic acid, glycolic acid, thioglycolic acid, diglycolic acid, thiodiglycolic acid, dithiodiglycolic acid, lactic acid, thiopropionic acid, tartaric acid, malic acid, citric acid, nitrilotriacetic acid, ethylene diaminodiacetic acid, diethylene triaminopentacetic. Generally, use is made of mixtures of acids. It is preferred that use should be made of phosphoric acid. Neutralization may be carried out stepwise, if desired. It is preferred that 45-100% of the available amino groups of the binder should be neutralized. The pH of the composition is generally in the range of 4-7, preferably 5-6.

The preparation of the aqueous coating composition is effected in a simple manner, for instance by adding the at least partly neutralized binder to deionized water while maintaining a concentration level of preferably 40-70% by weight. Subsequently, the resulting solution is diluted with water to a commonly used concentration of 1-25% by weight, preferably 5-15% by weight.

The aqueous coating composition further contains a curing agent for the hydroxyl groups-containing polymerization product. Representative curing agents include blocked polyisocyanates. Examples of suitable polyisocyanates include aliphatic, cycloaliphatic or aromatic diisocyanates such as trimethylene diisocyanate, tetramethylene diisocyanate, hexamethylene diisocyanate, trimethyl hexamethylene diisocyanate, 1,2-propylene diisocyanate, 2,3-butylene diisocyanate, ω,ω-dipropyl ether diisocyanate, 1,2-cyclohexane diisocyanate, 1,4-cyclohexane diisocyanate, isophoron diisocyanate, dicyclohexylmethane-4,4'-diisocyanate, 3,3'-dimethyl-dicyclohexylmethane-4,4'-diisocyanate, xylylene diisocyanate, 1,5-dimethyl-2,4-bis(isocyanatomethyl)benzene, 1,5-dimethyl-2,4-bis(isocyanatoethyl)benzene, 1,3,5-triethyl-2,4-bis(isocyanatomethyl)benzene, 4,4-diphenylmethane diisocyanate, 2,4-toluene diisocyanate, 2,6-toluene diisocyanate, naphthalene diisocyanate, dianisidine diisocyanate, 4,4'-diphenylether diisocyanate.

Also suitable for use are higher functional polyisocyanates such as the adduct of 3 molecules of hexamethylene diisocyanate and 1 molecule of water (available under the trade name Desmodur N of Bayer), the adduct of 1 molecular of trimethylol propane and 3 molecules of toluene diisocyanate (available under the trade name Desmodur L of Bayer) and the adduct of 1 molecule of trimethylol propane and 3 molecules of isophoron diisocyanate and compounds such as 1,3,5-triisocyanatobenzene and 2,4,6-triisocyanatotoluene.

Examples of suitable, known blocking agents include alcohols, lactams, hydroxamates and oximes. As examples of suitable alcohols, which may be aliphatic, cycloaliphatic or alkylaromatic, may be mentioned propanol, 1-butanol, 2-butanol, isobutanol and pentanols. Examples of suitable lactams include -caprolactam, butyrolactam and 2-pyrrolidone. As examples of suitable oximes may be mentioned ethylmethyl ketoxime. Preference is given to the use of blocked polyisocyanates as curing agents in cases where the aqueous coating composition is to be applied to the substrate cataphoretically. Other curing agents are, for instance, N-methylol and/or N-methylol ether groups-containing aminoplasts obtained by reacting an aldehyde, for example formaldehyde, with an amino or amido groups-containing compound such as melamine, urea, N,N'-ethylene urea, dicyandiamide and benzoguanamine; for the preparation of these compounds see, for instance, Houben-Weyl, Methoden der organischen Chemie, Volume 14/2, pp. 319-371 (1963). It is preferred that the aforedescribed compounds should entirely or partly be etherified with alcohols having 1 to 6 carbon atoms, for example with methanol, ethanol, n-propanol, isopropanol n-butanol, isobutanol, amyl alcohol, hexanol or mixtures of the above-envisaged alcohols. Especially, use can be made of a methylol melamine having 4 to 6 methylol groups per melamine molecule, at least 3 methylol groups being etherified with methanol, ethanol, propanol or butanol. More particularly, use can be made of a hexaalkoxymethyl melamine with the alkoxy group having 1 to 4 carbon atoms.

The aqueous coating composition may contain conventional adjuvants and additives, for instance: surface active compounds, anti-sag agents, dispersing agents, antioxidants, dispersion stabilizers, pigments and dyes. As examples of suitable pigments may be mentioned iron oxide, lead oxide, strontium chromate, carbon black, titanium dioxide, talc, silica, barium sulphate, cadmium yellow and cadmium red.

As substrate there is used in the present process an electrically conductive substrate, which may for instance be of a pretreated or non-pretreated metal or alloy, such as iron, steel, copper, brass or aluminum. The aqueous coating composition may be applied to an electrically conductive substrate for instance by brushing, spraying, dipping, electrostatic spraying, but preferably by cataphoresis. Cataphoresis may be carried out in the usual manner, for instance at a voltage of 50–500, preferably 100–350, and an initial current density of 0.1–40A/M². However, if desired, the aqueous coating composition may also be applied to any other electrically non-conductive substrate.

After the coating has been applied to the substrate, it is washed and dried in the usual manner and subsequently baked at a temperature of, for instance, 90°–250° C., preferably 110°–200° C. The time required for baking depends on the baking temperature and varies between about 1 minute and about 45 minutes.

The invention also pertains to an aqueous coating composition containing a cationic binder, characterized in that the cationic binder is obtained by polymerization of 100 parts by weight of a monomer mixture consisting of 1–30% by weight of a hydroxy (cyclo)alkyl (meth)acrylate of which the (cyclo)alkyl group has 2–8 carbon atoms, 4–45% by weight of an amino (meth)acrylate of the formula:

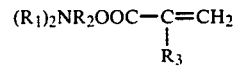

wherein $R_1$ is an alkyl group having 1–12 carbon atoms or a cycloalkyl group having 5–8 carbon atoms, or groups $R_1$ together form an alkylene group having 4–7 carbon atoms which together with the nitrogen atom forms a heterocyclic ring system, and wherein one of the groups $R_1$ may be a hydrogen atom, $R_2$ is a hydrocarbon group having 2–12 carbon atoms and $R_3$ is a hydrogen atom or a methyl group, and 40–80% by weight of a monovinyl aromatic hydrocarbon having 8–14 carbon atoms and 0–35% by weight of a different monoethylenically unsaturated monomer having 2–20 carbon atoms, in the presence of A=1–60 parts by weight of a polyester resin having a hydroxyl number in the range of 15 to 150, a calculated number average molecular weight Mn of 800–10,000 and U=0.1–5.0 equivalents of ethylenically unsaturated double bonds per 1000 molecular weight units, provided that the maximum value $U_{max}$ of U equals $$\frac{12.5 \times Mn \times (100 + A)}{A \times 10^6},$$

the amino groups contained in the binder being at least partly neutralized with the aid of an acid before, during or after polymerization.

In view of the aqueous coating composition it is preferred that the monomer mixture should contain, respectively, 5–24% by weight of the hydroxy (cyclo)alkyl (meth)acrylate; 7–40% by weight of the amino (meth)acrylate; 40–65% by weight of the monovinyl aromatic hydrocarbon, and that the polyester resin should be prepared by polycondensation of one or more aliphatic and/or cycloaliphatic mono-, di- and/or polyvalent alcohols having 2–24 carbon atoms and one or more aliphatic, cycloaliphatic and/or aromatic mono-, di- and/or polyvalent carboxylic acids having 2–36 carbon atoms and/or the anhydrides or acid halides thereof or the esters of such acids and alcohols having 1–6 carbon atoms. More particularly, the polyester resin is built up from, respectively, an alcohol having 2–9 carbon atoms; a cycloaliphatic or aromatic dicarboxylic acid having 8–10 carbon atoms or a derivative; a fatty acid having 5–18 carbon atoms, and from 3–70% by weight of an ethylenically unsaturated fatty acid. Finally, it is preferred that the cationic binder is obtained by polymerization of 100 parts by weight of the monomer mixture in the presence of 5–40 parts by weight of the polyester resin.

The invention will be further described in, but not limited by the following examples. Unless otherwise indicated, all parts and percentages are by weight. The cured coatings were tested for flexibility in accordance with DIN 53156 (Erichsen), for hardness in accordance with DIN 53157 (in sec.), for adhesion in accordance with DIN 53151 and for resistance to corrosion in a salt spray test in accordance with DIN 50021, use being made of a 5% by weight solution of sodium chloride in water for 672 hours. The measured values are given in the table. Also the flexibility in accordance with DIN 53152 (8 mm mandrel) was measured. It was found to be excellent in all examples; there was no formation of cracks. In the high humidity and condensation test in accordance with DIN 50017 none of the coatings showed any blistering, not even after 500 hours' exposure.

EXAMPLE 1

In a reactor provided with a stirrer, a water separator and a reflux condenser there were intermixed 45.8 parts of dehydrated castor oil fatty acid, 25.8 parts of trimethylol propane, 28.4 parts of phthalic anhydride and 5 parts of xylene. During mixing the reaction mixture was kept at a temperature of 230°–240° C., water (5.8 parts) being removed, until the reaction mixture had an acid number of 15. The Gardner Holdt viscosity of a 50% solution of the reaction mixture in monobutyl ether of ethylene glycol was H. After the reaction mixture had been cooled, it was diluted with monobutyl ether of ethylene glycol to a 60%-solution.

Subsequently, the above-described polyester resin solution (6.0 parts) were mixed with 33.5 parts of monobutyl ether of ethylene glycol and the mixture in the afore-described reactor (without water separator) was heated to a temperature of 100° C. Next, a mixture of 32.0 parts of styrene, 8.0 parts of methyl methacrylate, 11.2 parts of hydroxyethyl acrylate, 6.7 parts of β-dimethylamino ethyl methacrylate and 0.6 parts of 2.2′-azobisisobutyronitrile was introduced into the reactor in such a way that the temperature of the reactor contents did not rise to above 115° C.

After the monomer mixture had been added, the contents of the reactor were kept at 100° C. for another 30 minutes. Finally, a mixture of 0.6 parts of 2.2′-azobisisobutyronitrile and 1.3 parts of monobutyl ether of ethylene glycol was added to the reactor contents in 4 equal portions, each of them over a period of 30 minutes, in the process of which and for 3 more hours the reaction mixture was kept at a temperature of 100°–110° C. The resulting binder solution had a solids contents of 62½%.

A coating composition was prepared by intermixing 32.0 parts of the afore-described binder solution, 10.3 parts of an 80%-solution of an adduct of 3 molecules of hexamethylene diisocyanate and 1 molecule of water, the adduct being blocked with ε-caprolactam (the non-blocked adduct is available under the trade name of Desmodur N of Bayer), 10.8 parts of titanium dioxide, 0.6 parts of polypropylene glycol (type 4020), 7.1 parts of monobutyl ether of ethylene glycol, 1.0 part of ethyl ether of ethylene glycol, 0.8 parts of an 85%-solution of phosphoric acid and deionized water in an amount such that a composition having a solids content of about 11% was obtained.

The aqueous coating composition was applied to a steel panel (Bonder 29/60) by cataphoretic deposition at a voltage of 210, a temperature of 25° C. and an initial current density of 20 A/m$^2$ to a coating thickness of 20–25 μm (in the cured state) and subsequently cured for 30 minutes at a temperature of 180° C.

EXAMPLE 2

In the reactor of Example 1 there were intermixed 45.6 parts of phthalic anhydride and 27.6 parts of neopentyl glycol and kept at a temperature of 220° C. until the resulting reaction mixture had an acid number of 90. After the reaction mixture had been cooled, 8.6 parts of maleic anhydride and 18.2 parts of neopentyl glycol were added and polycondensation was continued until the reaction mixture had an acid number of 15. The water (7.1 g) evolved during polycondensation was discharged through a column. The resulting polyester was diluted to a 60%-solution with monobutyl ether of ethylene glycol.

Subsequently, 4.7 parts of the afore-described polyester solution were mixed with 33.7 parts of monobutyl ether of ethylene glycol and in the afore-described reactor the mixture was heated to a temperature of 100° C. In the next step the reactor was charged over a period of 3 hours with a mixture of 33.1 parts of styrene, 83 parts of methyl methacrylate, 11.6 parts of hydroxyethyl acrylate, 5.8 parts of dimethylamino ethyl methacrylate and 0.6 parts of 2.2′-azobisisobutyronitrile, in such a way that the temperature of the reactor contents did not rise to above 115° C. After the monomer mixture had been added, the reactor contents were kept at 100° C. for another 30 minutes. Finally, a mixture of 0.6 parts of 2.2′-azobisisobutyronitrile and 1.4 parts of monobutyl ether of ethylene glycol was added to the contents of the reactor in 4 equal portions, each of them over a period of 30 minutes, in the process of which and for 3 more hours the reaction mixture was kept at a temperature of 100°–110° C. The resulting binder solution had a solids content of 62½% by weight.

An aqueous coating composition was prepared by mixing the afore-described binder solution in the same manner and in the same weight proportions as in Example 1 with the curing agent, the pigment, the polypropylene glycol, the solvents, the catalyst and water. The resulting composition had a solids content of about 11%.

The aqueous coating composition was applied to a steel panel (Bonder 29/60) by cataphoretic deposition in the same way as in Example 1 to a coating thickness of 20–25 μm (in the cured state) and subsequently cured for 15–30 minutes at a temperature of 160°–180° C.

EXAMPLE 3

6.2 parts of the 60% polyester solution according to Example 1 were mixed with 33.6 parts of monobutyl ether of ethylene glycol and in the reactor of Example 1 the mixture was heated to a temperature of 100° C. In the next step the reactor was charged over a period of 2 hours with a mixture of 12.4 parts of styrene, 12.4 parts of methyl methacrylate, 11.2 parts of hydroxyethyl acrylate, 9.3 parts of β-dimethylamino ethyl methacrylate and 0.4 parts of 2.2′-azobisisobutyronitrile, in such a way that the temperature of the contents of the reactor did not rise to above 100° C. Subsequently, a mixture of 12.4 parts of styrene and 0.1 part of 2.2'-azobisisobutyronitrile was added to the reactor contents dropwise over a period of 1 hour at the same temperature. After this monomer mixture had been added, the contents of the reactor were kept at 100° C. for another 30 minutes. Finally, a mixture of 0.6 parts of 2.2'-azobisisobutyronitrile and 1.4 parts of monobutyl ether of ethylene glycol was added to the reactor contents in 4 equal portions, each of them over a period of 30 minutes, in the process of which and for 3 more hours the reaction mixture was kept at a temperature of 100°-110° C. The resulting binder solution had a solids content of 62½%.

An aqueous coating composition was prepared by mixing the afore-described binder solution in the same manner and in the same weight proportions as in Example 1 with the curing agent, the pigment, the polypropylene glycol, the solvents, the catalyst and water. The resulting composition had a solids content of about 11%.

The aqueous coating composition was applied to a steel panel (Bonder 29/60) by cataphoretic deposition at a voltage of 150 and a temperature of 25° C. to a layer thickness of 17 $\mu$m (in the cured state) and subsequently cured for 30 minutes at a temperature of 180° C.

EXAMPLE 4

In the reactor according to Example 1 a mixture was prepared from 61.0 parts of dehydrated castor oil fatty acid, 23.6 parts of phthalic anhydride, 80 parts of trimethylol propane, 13,4 parts of pentaerythritol and 5 parts of xylene. The reaction mixture was kept at a temperature of 240° C. until it had an acid number of 11. After the product obtained had been cooled, it was diluted to a 60%-solution with monobutyl ether of ethylene glycol.

Subsequently, 6.2 parts of the afore-described polyester resin solution were mixed with 33.6 parts of monobutyl ether of ethylene glycol and in the afore-described reactor the resulting mixture was heated to a temperature of 100° C. In the next step the reactor was charged over a period of 1½ hours with a mixture of 7.3 parts of styrene, 7.8 parts of methyl methacrylate, 5.6 parts of hydroxyethyl acrylate, 6.7 parts of $\beta$-dimethylamino ethyl methacrylate and 0.3 parts of 2.2'-azobisisobutyronitrile, in such a way that the temperature of the contents of the reactor did not rise to above 100°-110° C. Subsequently, a mixture of 24.2 parts of styrene, 5.6 parts of hydroxyethyl acrylate and 0.3 parts of 2.2'-azobisisobutyronitrile was added to the reactor contents dropwise. Finally, a mixture of 0.6 parts of 2.2'-azobisisobutyronitrile and 1.4 parts of monobutyl ether of ethylene glycol was added to the contents of the reactor in 4 equal portions, each of them over a period of 30 minutes, in the process of which and for 3 more hours the reaction mixture was kept at a temperature of 100°-110° C. The resulting binder solution had a solids content of 62½%.

An aqueous coating composition was prepared by mixing the afore-described binder solution in the same weight proportions as in Example 1 with the curing agent, the pigment, the polypropylene glycol, the solvents, the catalyst and water. The resulting composition had a solids content of about 11%.

The aqueous coating composition was applied to a steel panel (Bonder 29/60) by cataphoretic deposition at a voltage of 210 and a temperature of 25° C. to a layer thickness of 25 $\mu$m (in the cured state) and subsequently cured for 30 minutes at a temperature of 180° C.

EXAMPLE 5

The preparation of the polyester resin solution according to Example 1 was repeated, except that a polyester resin having an acid number of 10 was prepared.

Then, 30.5 parts of the above-described polyester resin solution were mixed with 26.3 parts of monobutyl ether of ethylene glycol and the mixture in the reactor (without water separator) according to Example 1 was heated to a temperature of 100° C. Next, a mixture of 19.6 parts of styrene, 4.9 parts of methyl methacrylate, 10.9 parts of hydroxyethyl acrylate, 6.5 parts of $\beta$-dimethylamino ethyl methacrylate and 1.2 parts of 2.2'-azobisisobutyronitrile was introduced into the reactor in such a way that the temperature of the reactor contents did not rise to above 105° C.

After the monomer mixture had been added, the contents of the reactor were kept at 100° C. for another 60 minutes. Finally, a mixture of 0.6 parts of 2.2'-azobisisobutyronitrile and 1.3 parts of monobutyl ether of ethylene glycol was added to the reactor contents in 2 equal portions, each of them over a period of 60 minutes, in the process of which and for 1 more hours the reaction mixture was kept at a temperature of 100°-110° C. The resulting binder solution had a solids contents of 59%.

Finally, a coating composition was prepared by mixing the afore-described binder solution in the same manner and in the same weight proportions as in Example 1 with curing agent, the pigment, the polypropylene glycol, the solvents, the catalyst and water, and it was applied and cured in the same way as in Example 1.

EXAMPLE 6

In a reactor provided with a stirrer, a water separator and a reflux condenser there were intermixed 620.4 parts of dehydrated castor oil fatty acid, 359.3 parts of trimethylol propane, 385.0 parts of phthalic anhydride, 0.7 parts of dibutyltin dilaurate and 70 parts of xylene. During mixing the reaction mixture was kept at a temperature of 230°-240° C., water being removed, until the reaction mixture had an acid number of 10.5. The Gardner Holdt viscosity of a 70% solution of the reaction mixture in monobutyl ether of ethylene glycol was I+. After the reaction mixture had been cooled, it was diluted with monobutyl ether of ethylene glycol to a 60%-solution.

Then, the above-described polyester resin solution (996.6 parts) were mixed with 360.1 parts of monobutyl ether of ethylene glycol and the mixture in the reactor (without water separator) according to Example 1 was heated to a temperature of 100° C. Next, a mixture of 337.8 parts of styrene, 84.7 parts of methyl methacrylate, 118.6 parts of hydroxyethyl acrylate, 70.9 parts of $\beta$-dimethylamino ethyl methacrylate and 15.0 parts of 2.2'-azobisisobutyronitrile was introduced into the reactor over a period of 3 hours in such a way that the temperature of the reactor contents did not rise to above 115° C. After the monomer mixture had been added, the contents of the reactor were kept at 100° C. for another 60 minutes. Finally, a mixture of 6.0 parts of 2.2'-azobisisobutyronitrile and 12.0 parts of monobutyl ether of ethylene glycol was added to the reactor contents in 2 equal portions, each of them over a period of 60 minutes, in the process of which and for 3 more hours the reaction mixture was kept at a temperature of 100°–110° C. The resulting binder solution had a solids contents of 58.8%.

Finally, a coating composition was prepared by mixing the afore-described binder solution in the same manner and in the same weight proportions as in Example 1 with the curing agent, the pigment, the polypropylene glycol, the solvents, the catalyst and water, and it was applied and cured in the same way as in Example 1.

EXAMPLE 7

Example 6 was repeated, except that the binder solution was prepared on the basis of a mixture of only 305.1 parts of the polyester resin solution with 262.9 parts of the monobutyl ether of ethylene glycol, and of 196.1 parts of styrene, 49.2 parts of methyl methacrylate, 109.3 parts of hydroxyethyl acrylate, 65.4 parts of β-dimethylamino ethyl methacrylate and 12.0 parts of 2.2′-azobisisobutyronitrile. The after-reaction was carried out by adding a mixture of 3.0 parts of the 2.2′-azobisisobutyronitrile and 6.0 parts of the monobutyl ether of ethylene glycol to the reactor in 2 equal portions. The resulting binder solution had a solids content of 59%.

EXAMPLE 8

In a reactor provided with a stirrer, a water separator and a reflux condenser there were intermixed 45.4 parts of dehydrated castor oil fatty acid, 26.3 parts of trimethylol propane, 28.2 parts of phthalic anhydride and 5 parts of xylene. During mixing the reaction mixture was kept at a temperature of 230°–240° C., 6.0 parts of water being removed, until the reaction mixture had an acid number of 11. The Gardner Holdt viscosity of a 50% solution of the reaction mixture in monobutyl ether of ethylene glycol was I. After the reaction mixture had been cooled, it was diluted with monobutyl ether of ethylene glycol to a 60%-solution.

Subsequently, 30.0 parts of the above-described polyester resin solution were mixed with 25.6 parts of monobutyl ether of ethylene glycol and the mixture in the reactor (without water separator) according to Example 1 was heated to a temperature of 100° C. Next, a mixture of 19.2 parts of styrene, 4.8 parts of methyl methacrylate, 10.7 parts of hydroxyethyl acrylate, 6.4 parts of β-dimethylamino ethyl methacrylate and 1.2 parts of 2.2′-azobisisobutyronitrile was introduced into the reactor over a period of 3 hours in such a way that the temperature of the reactor contents did not rise to above 115° C.

After the monomer mixture had been added, the contents of the reactor were kept at 100° C. for another 30 minutes. Finally, a mixture of 0.6 parts of the 2.2′-azobisisobutyronitrile and 1.2 parts of monobutyl ether of ethylene glycol was added to the reactor contents in 2 equal portions, each of them over a period of 1 hour, in the process of which and for 1 more hour the reaction mixture was kept at a temperature of 100°–110° C. The resulting binder solution had a solids contents of 59%.

A coating composition was prepared by intermixing 32.0 parts of the afore-described binder solution, 10.3 parts of an 80%-solution of an adduct of 3 molecules of hexamethylene diisocyanate and 1 molecule of water, the adduct being blocked with a mixture of methyl ethyl ketoxime and ε-caprolactam in a molar ratio of 1:4 (the non-blocked adduct is available under the trade name of Desmodur N of Bayer), 10.8 parts of titanium dioxide, 0.6 parts of polypropylene glycol (type 4020), 7.1 parts of monobutyl ether of ethylene glycol, 1.0 part of ethyl ether of ethylene glycol, 0.8 parts of an 85%-solution of phosphoric acid and deionized water in an amount such that a composition having a solids content of about 11% was obtained.

The aqueous coating composition was applied to a steel panel by brushing to a coating thickness of 40 μm (in the cured state) and subsequently cured for 10 minutes at a temperature of 140° C. and then for 15 minutes at a temperature of 175° C.

TABLE

| Examples | Flexibility | Hardness (in sec) | Adhesion | Corrosion resistance |
|---|---|---|---|---|
| 1 | 7 | 130 | Gt 0 | 0–1 |
| 2 | 5 | 131 | Gt 0 | 1–2 |
| 3 | 5 | 122 | Gt 0–1 | 2–4 |
| 4 | 8 | 100 | Gt 0 | 0–1 |
| 5 | 5 | 230 | Gt 0–1 | 2–4 |
| 6 | 7–8 | 210 | Gt 0–1 | 3–4 |
| 7 | 5–6 | 240 | Gt 0–1 | 1–3 |
| 8 | 4–6 | 195 | Gt 0 | 1–2 |

We claim:

1. A process for coating an electrically conductive substrate with an aqueous coating composition containing a cationic binder, which comprises:

(a) preparing a binder by polymerizing (i) 100 parts by weight of a monomer mixture consisting of 1–30% by weight of a hydroxyalkyl or hydroxycycloalkyl acrylate or methacrylate wherein the alkyl or cycloalkyl group has 2–8 carbon atoms, (ii) 4–45% by weight of an aminoalkyl acrylate or aminoalkyl methacrylate of the formula:

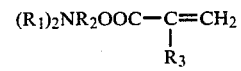

wherein $R_1$ is an alkyl group having 1–12 carbon atoms or a cycloalkyl group having 5–8 carbon atoms, or groups $R_1$ together form an alkylene group having 4–7 carbon atoms which together with the nitrogen atom forms a heterocyclic ring system, and wherein one of the groups $R_1$ may be a hydrogen atom, $R_2$ is a hydrocarbon group having 2–12 carbon atoms and $R_3$ is a hydrogen atom or a methyl group, and (iii) 40–80% by weight of a monovinyl aromatic hydrocarbon having 8–14 carbon atoms and 0–35% by weight of a different monoethylenically unsaturated monomer having 2–20 carbon atoms, in the presence of A=1–60 parts by weight of a polyester resin having a hydroxyl number in the range of 15 to 150, a calculated number average molecular weight $M_n$ of 800–10,000 and U=0.1–5.0 equivalents of ethylenically unsaturated double bonds per 1000 molecular weight units, provided that the maximum value $U_{max}$ of U equals $$\frac{12.5 \times M_n \times (100 + A)}{A \times 10^6},$$

(b) neutralizing the amino groups contained in the binder at least partially with an acid before, during or after polymerization, and then, (c) preparing an aqueous coating composition by adding to the resultant cationic binder water, pigment and a curing agent for the binder;

(d) coating the electrically conductive substrate with said aqueous coating composition by cataphoretic deposition; and
(e) curing the coating.

2. A process according to claim 1, wherein the hydroxyalkyl or hydroxycycloalkyl acrylate or methacrylate in the monomer mixture is hydroxy ethyl acrylate, hydroxy propyl acrylate or mixtures thereof.

3. A process according to claim 1, wherein the monomer mixture contains 5-24% by weight of the hydroxyalkyl or hydroxycycloalkyl acrylate or methacrylate.

4. A process according to claim 1, wherein the amino acrylate or amino methacrylate in the monomer mixture is an alkylamino or dialkylamino acrylate or methacrylate of which the alkyl groups have 1-4 carbon atoms.

5. A process according to claim 1, wherein as the amino acrylate or amino methacrylate in the monomer mixture is $\beta$-alkylaminoethyl or $\beta$-dialkylaminoethyl acrylate or methacrylate the alkyl groups have 1-4 carbon atoms.

6. A process according to claim 1, wherein the monomer mixture contains 7-40% by weight of amino acrylate or amine methacrylate.

7. A process according to claim 1, characterized in that the monomer mixture contains 10-28% by weight of amino acrylate or amine methacrylate.

8. A process according to claim 1, wherein the monovinyl aromatic hydrocarbon in the monomer mixture has 8-10 carbon atoms.

9. A process according to claim 8, wherein the monovinyl aromatic hydrocarbon is styrene, vinyl toluene or mixtures thereof.

10. A process according to claim 1, wherein the monomer mixture contains 40-65% by weight of the monovinyl aromatic hydrocarbon.

11. A process according to claim 1, wherein the monomer mixture contains 0-15% by weight of a different monoethylenically unsaturated monomer.

12. A process according to claim 1, wherein the polyester resin is prepared by condensing one or more aliphatic, cycloaliphatic mono-, di- or polyvalent alcohols having 2-24 carbon atoms and one or more aliphatic, cycloaliphatic or aromatic mono-, di- or polyvalent carboxylic acids having 2-36 carbon atoms, or the anhydrides or acid halides thereof, or the esters of such acids with alcohols having 1-6 carbon atoms.

13. A process according to claim 12, wherein the alcohol has 2-9 carbon atoms.

14. A process according to claim 13, wherein the alcohol is neopentyl glycol, trimethylol propane, pentaerythritol or mixtures thereof.

15. A process according to claim 12, wherein the carboxylic acid has 2-12 carbon atoms.

16. A process according to claim 12, wherein the cycloaliphatic or aromatic dicarboxylic acid has 8-10 carbon.

17. A process according to claim 16, wherein the dicarboxylic acid is a tetrahydrobenzene dicarboxylic acid, a hexahydrobenzene dicarboxylic acid, a benzene dicarboxylic acid or mixtures thereof.

18. A process according to claim 12, wherein the fatty acid has 5-18 carbon atoms.

19. A process according to claim 12, wherein the fatty acid has 7-18 carbon atoms.

20. A process according to claim 12, wherein the polyester is prepared using 3-70% by weight of an ethylenically unsaturated fatty acid.

21. A process according to claim 20, wherein the polyester is prepared using 5-55% by weight of an ethylenically unsaturated fatty acid.

22. A process according to claim 1, comprising polymerizing 100 parts by weight of the monomer mixture in the presence of 5-50 parts by weight of the polyester resin.

23. A process according to claim 1, comprising polymerizing 100 parts by weight of the monomer mixture in the presence of 5-40 parts by weight of the polyester resin.

24. A process according to claim 1, wherein the monomer mixture contains hydroxyalkyl or hydroxycycloalkyl acrylate or methacrylate, monovinyl aromatic hydrocarbon and the said different ethylenically unsaturated monomer in amounts such that the binder contains more than 70% by weight thereof.

25. A process according to claim 1, wherein the polyester resin has a hydroxyl number of 30-70, a calculated number average molecular weight of 1500-8000 and an unsaturation of 0.3-3.5 equivalents of ethylenically unsaturated double bonds per 1000 molecular weight units.

26. A process according to claim 1, wherein cataphoretic deposition is at a voltage of 50-500 and an initial current density of 0.1-40 A/m$^2$.

27. A process according to claim 1, wherein the coating applied to the substrate is cured by baking at a temperature of 90°-250° C.

28. A process according to claim 1, wherein the coating applied to the substrate is cured by baking at a temperature of 110°-200° C.

29. An aqueous coating composition comprising a cationic binder prepared by polymerizing:
(i) 100 parts by weight of a monomer mixture consisting of 1-30% by weight of a hydroxyalkyl or or hydroxycycloalkyl acrylate or methacrylate wherein the alkyl or cycloalkyl group has 2-8 carbon atoms;
(ii) 4-45% by weight of aminoacrylate or aminomethacrylate of the formula:

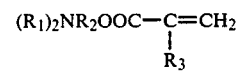

wherein $R_1$ is an alkyl group having 1-12 carbon atoms or a cycloalkyl group having 5-8 carbon atoms, or groups $R_1$ together form an alkylene group having 4-7 carbon atoms which together with the nitrogen atom forms a heterocyclic ring system, and wherein one of the groups $R_1$ may be a hydrogen atom, $R_2$ is a hydrocarbon group having 2-12 carbon atoms and $R_3$ is a hydrogen atom or a methyl group, and
(iii) 40-80% by weight of a monovinyl aromatic hydrocarbon having 8-14 carbon atoms and 0-35% by weight of a different monoethylenically unsaturated monomer having 2-20 carbon atoms, in the presence of A=1-60 parts by weight of a polyester resin having a hydroxyl number in the range of 15 to 150, a calculated number average molecular weight Mn of 800-10,000 and U=0.1-5.0 equivalents of ethylenically unsaturated double bonds per 1000 molecular weight units, provided that the maximum value U$_{max}$ of U equals $$\frac{12.5 \times Mn \times (100 + A)}{A \times 10^6},$$

the amino groups contained in the binder being at least partly neutralized with the aid of an acid before, during or after polymerization.

30. A composition according to claim 29, wherein the monomer mixture contains 5–24% by weight of the hydroxyalkyl or hydroxycycloalkyl acrylate or methacrylate.

31. A composition according to claim 29, wherein the monomer mixture contains 7–40% by weight of the amino acrylate or amino methacrylate.

32. A composition according to claim 29, wherein the monomer mixture contains 40–65% by weight of the monovinyl aromatic hydrocarbon.

33. A composition according to claim 29, wherein the polyester resin is prepared by polycondensation of one or more aliphatic or cycloaliphatic mono-, di- or polyvalent alcohols having 2–24 carbon atoms and one or more aliphatic, cycloaliphatic and/or aromatic mono-, di- or polyvalent carboxylic acids having 2–36 carbon atoms or the anhydrides or acid halides thereof or the esters of such acids with alcohols having 1–6 carbon atoms.

34. A composition according to claim 33, wherein the alcohols have 2–9 carbon atoms.

35. A composition according to claim 33, wherein the acid is a cycloaliphatic or aromatic dicarboxylic acid having 8–10 carbon atoms.

36. A composition according to claim 33, wherein the aliphatic acid is a fatty acid having 5–18 carbon atoms.

37. A composition according to claim 33, wherein the polyester contains from 3–70% by weight of an ethylenicaly unsaturated fatty acid.

38. A composition according to claim 29, wherein the cationic binder is obtained by polymerization of 100 parts by weight of the monomer mixture in the presence of 5–40 parts by weight of the polyester resin.

* * * * *